US008757479B2

(12) United States Patent
Clark et al.

(10) Patent No.: US 8,757,479 B2
(45) Date of Patent: Jun. 24, 2014

(54) METHOD AND SYSTEM FOR CREATING PERSONALIZED PACKAGING

(75) Inventors: Robert Alan Clark, Williamson, NY (US); Jess Robert Gentner, Rochester, NY (US); William J. Nowak, Webster, NY (US); Reiner Eschbach, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/563,079

(22) Filed: Jul. 31, 2012

(65) Prior Publication Data

US 2014/0038802 A1 Feb. 6, 2014

(51) Int. Cl.
*G06F 17/00* (2006.01)

(52) U.S. Cl.
USPC ...... 235/375; 235/383; 235/385; 235/462.01; 235/462.14

(58) Field of Classification Search
USPC ............... 235/375, 383, 385, 462.01, 462.14, 235/462.45, 462.49
See application file for complete search history.

(56) References Cited

U.S. PATENT DOCUMENTS

| | | | |
|---|---|---|---|
| 3,902,655 | A | 9/1975 | Huffman |
| 5,235,519 | A | 8/1993 | Miura |
| 5,291,583 | A | 3/1994 | Bapat |
| 5,353,390 | A | 10/1994 | Harrington |
| 5,457,904 | A | 10/1995 | Colvin |
| 5,513,117 | A | 4/1996 | Small |
| 5,518,574 | A | 5/1996 | Yates et al. |
| 5,528,517 | A | 6/1996 | Loken |
| 5,687,087 | A | 11/1997 | Taggart |
| 5,768,142 | A | 6/1998 | Jacobs |
| 5,805,784 | A | 9/1998 | Crawford |
| 5,838,574 | A | 11/1998 | Olson et al. |
| 5,881,538 | A | 3/1999 | Blohm |
| 5,923,556 | A | 7/1999 | Harris |
| 6,005,959 | A | 12/1999 | Mohan et al. |
| 6,090,027 | A | 7/2000 | Brinkman |
| 6,092,054 | A | 7/2000 | Tackbary et al. |
| 6,117,061 | A | 9/2000 | Popat et al. |
| 6,134,018 | A | 10/2000 | Dziesietnik et al. |
| 6,153,039 | A | 11/2000 | Jacobsen |
| 6,237,787 | B1 | 5/2001 | Gallo et al. |

(Continued)

FOREIGN PATENT DOCUMENTS

| | | | |
|---|---|---|---|
| EP | 621113 | A1 | 10/1994 |
| WO | 2005000681 | A2 | 1/2005 |

(Continued)

OTHER PUBLICATIONS

Lu et al., "Folding Cartons with Fixtures: A Motion Planning Approach", IEEE Transactions on Robotics and Automation, vol. 16, No. 4, Aug. 2000, pp. 346-356.

(Continued)

*Primary Examiner* — Tuyen K Vo
(74) *Attorney, Agent, or Firm* — Fox Rothschild LLP

(57) ABSTRACT

A personalized package creation system uses an imaging device to capture an image of a barcode. An image capture module decodes the barcode to retrieve data, such as package dimension data and one or more package structural parameters. Based on the package dimensions and the structural parameter, a processing device defines a set of cutting instructions. An automated package generation device applies the cutting instructions and uses a cutting device to creating a package.

20 Claims, 5 Drawing Sheets

(56) References Cited

U.S. PATENT DOCUMENTS

| | | | |
|---|---|---|---|
| 6,243,172 B1 | 6/2001 | Gauthier et al. | |
| 6,246,468 B1 | 6/2001 | Dimsdale | |
| 6,332,149 B1 | 12/2001 | Warmus et al. | |
| 6,409,019 B1 | 6/2002 | Hornsby et al. | |
| 6,687,016 B2 | 2/2004 | Gauthier | |
| 6,689,035 B1 | 2/2004 | Gerber | |
| 6,771,387 B2 | 8/2004 | Gauthier | |
| 6,895,549 B1 | 5/2005 | Albright et al. | |
| 6,896,250 B2 | 5/2005 | Hillebrand | |
| 6,939,063 B2 | 9/2005 | Bussell | |
| 6,945,645 B2 | 9/2005 | Baron | |
| 6,948,115 B2 | 9/2005 | Aizikowitz et al. | |
| 6,953,513 B1 | 10/2005 | Volkert | |
| 7,013,616 B1 | 3/2006 | Powers et al. | |
| 7,191,392 B1 | 3/2007 | Coar | |
| 7,197,465 B1 | 3/2007 | Hu et al. | |
| 7,243,303 B2 | 7/2007 | Purvis et al. | |
| 7,293,652 B2 | 11/2007 | Learn et al. | |
| 7,327,362 B2 | 2/2008 | Grau | |
| 7,337,980 B2 * | 3/2008 | Schaedel | 235/494 |
| 7,366,643 B2 | 4/2008 | Verdura et al. | |
| 7,367,027 B1 | 4/2008 | Chen et al. | |
| 7,406,194 B2 | 7/2008 | Aizikowitz et al. | |
| 7,413,175 B2 | 8/2008 | Levine et al. | |
| 7,446,404 B2 | 11/2008 | Huang et al. | |
| 7,647,752 B2 | 1/2010 | Magnell | |
| 7,832,560 B2 | 11/2010 | Tilton | |
| 7,941,465 B2 | 5/2011 | Gombert et al. | |
| 8,160,992 B2 | 4/2012 | Gombert et al. | |
| 8,170,706 B2 | 5/2012 | Gombert et al. | |
| 8,170,709 B2 | 5/2012 | Puissant | |
| 8,195,227 B1 * | 6/2012 | Bushman et al. | 455/556.1 |
| 2002/0085001 A1 | 7/2002 | Taylor | |
| 2002/0091592 A1 * | 7/2002 | Sugiura et al. | 705/28 |
| 2002/0104293 A1 * | 8/2002 | Armington et al. | 53/472 |
| 2002/0118874 A1 | 8/2002 | Chung et al. | |
| 2003/0035138 A1 | 2/2003 | Schilling | |
| 2003/0083763 A1 | 5/2003 | Kiyohara et al. | |
| 2003/0091227 A1 | 5/2003 | Chang et al. | |
| 2003/0164875 A1 | 9/2003 | Myers | |
| 2003/0200111 A1 | 10/2003 | Damji | |
| 2004/0073407 A1 | 4/2004 | Nguyen et al. | |
| 2004/0120603 A1 | 6/2004 | Gupta | |
| 2004/0218799 A1 | 11/2004 | Mastic et al. | |
| 2005/0005261 A1 | 1/2005 | Severin | |
| 2005/0012949 A1 * | 1/2005 | Kitahara et al. | 358/1.11 |
| 2005/0050052 A1 | 3/2005 | Zimmerman et al. | |
| 2005/0132356 A1 | 6/2005 | Cross et al. | |
| 2005/0249400 A1 | 11/2005 | Fukumoto | |
| 2006/0080274 A1 | 4/2006 | Mourad | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0041035 A1 | 2/2007 | Sembower et al. | |
| 2007/0042885 A1 | 2/2007 | Rietjens et al. | |
| 2007/0112460 A1 | 5/2007 | Kiselik | |
| 2008/0020916 A1 * | 1/2008 | Magnell | 493/65 |
| 2008/0048308 A1 | 2/2008 | Lam | |
| 2008/0255945 A1 | 10/2008 | Percival et al. | |
| 2008/0273945 A1 | 11/2008 | Levine et al. | |
| 2009/0063381 A1 | 3/2009 | Chan et al. | |
| 2009/0070213 A1 | 3/2009 | Miller et al. | |
| 2009/0236752 A1 | 9/2009 | Lee et al. | |
| 2009/0278843 A1 * | 11/2009 | Evans | 345/419 |
| 2009/0282782 A1 | 11/2009 | Walker et al. | |
| 2009/0287632 A1 | 11/2009 | Gombert et al. | |
| 2010/0060909 A1 | 3/2010 | Conescu et al. | |
| 2010/0098319 A1 | 4/2010 | Gombert et al. | |
| 2010/0110479 A1 | 5/2010 | Gombert et al. | |
| 2010/0214622 A1 | 8/2010 | Ruegg et al. | |
| 2013/0120767 A1 | 5/2013 | Mandel et al. | |
| 2013/0120770 A1 | 5/2013 | Mandel et al. | |

FOREIGN PATENT DOCUMENTS

| | | |
|---|---|---|
| WO | 2005054983 A2 | 6/2005 |
| WO | 2005122079 A2 | 12/2005 |
| WO | WO-2006108269 A1 | 10/2006 |
| WO | 2007021920 A2 | 2/2007 |

OTHER PUBLICATIONS http:/www.esko.com/tmp/080606115325/G2558322_Kongsberg_tables_us_pdf.

* cited by examiner

METHOD AND SYSTEM FOR CREATING PERSONALIZED PACKAGING

BACKGROUND

When selecting a package for a product that is to be sold or shipped, product manufacturers and sellers typically must select a package from a specific inventory of available package sizes and shapes. However, this may result in a package that is not entirely suitable for the product. For example, when using a package that is larger than the product requires, additional packaging material may be needed to avoid damage to the product during handling. In addition, a larger package can require increased shipping and handling costs.

Thus, there has been significant interest in the manufacture of personalized packaging for small volume applications. For example, a unique product such as a work of art may benefit from having a unique package. However, the creation of unique packages can require additional costs and significant setup time. Current automated packaging solutions are designed for medium to high volumes, and it is not easy to vary the physical properties of individual packages within a run of products. This document describes systems and methods that present solutions to the problems discussed above, and which may also provide additional benefits.

SUMMARY

In an embodiment, a method of creating a package uses an imaging device to capture an image of a barcode. An image capture module decodes the barcode to retrieve data, such as package dimension data and one or more package structural parameters. Based on the package dimensions and the structural parameter, a processing device defines a set of cutting instructions. An automated package generation device applies the cutting instructions and uses a cutting device to creating a package in the form of a package flat.

In some embodiments, when capturing the image, the barcode that the imaging device captures is, at the time of capture, printed on the substrate that the cutting device will use to yield the package.

In some embodiments, when defining the set of cutting instructions, the processor may retrieve a template from a database based on the package dimension data and the package structural parameter. The package structural parameter may comprise a shape of a facet of the package. The template may comprise a rule set. When defining the set of cutting instructions the processor may apply the shape and the package dimensions to the rule set to identify additional facets for the package flat. For each facet, the processor may apply a dimension set and a position relative to at least one of the other facets. Additionally, for each facet, the processor may define a set of instructions to create edges. At least one of the edges comprises a cut line, and one or more other edges comprises a fold line.

Optionally, the processor may select an algorithm based on the an indicator in the barcode and apply the structural parameter to the algorithm. The structural parameter may include information relating to at least one facet of the package. In some embodiments, it may have information relating to no more than one facet of the package.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

For the purposes of this document, a "barcode" refers to any machine-readable representation of encoded data, such as a Universal Product Code (UPC), data matrix code, Quick Response (QR) code or other one or two-dimensional symbology, glyph, Aztec code, Maxi code and the like.

An "imaging device" refers to any device capable of optically viewing an object and converting an interpretation of that object into electronic signals. One example of an imaging device is a camera lens. An "image capture module" refers to the software application and/or the image sensing hardware of an electronic device that is used to capture images of barcodes and other symbologies.

Package production may be performed by a printing device that is capable of performing printing and cutting operations on a substrate. The device also may perform other actions such as imparting a crease, coating, and/or stacking. Examples of automated package production devices include those in the iGen™ series of digital production printing presses, available from Xerox Corporation. Typically, the substrate will be thicker than ordinary paper. For example, it may be cardboard, cardstock, or another material that will provide a self-supporting three-dimensional structure when folded into a package.

Figure 1:
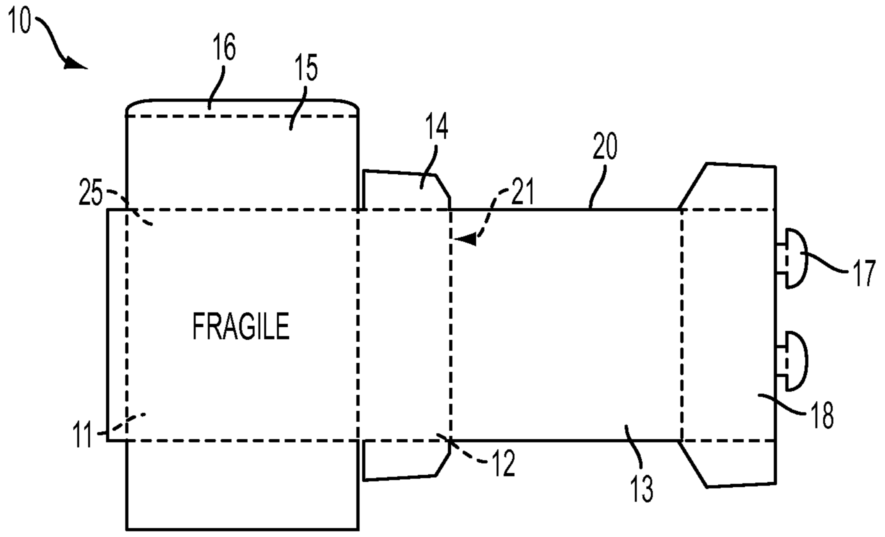
FIG. 1 depicts an example of a printed package flat.

FIG. 1 shows an example of a printed package flat 10 that an automated package production device may produce. The machine may produce the flat based on data that is maintained in a package data file, such as package dimensions and structural features. The device uses the dimensions and features to produce the flat. The flat includes one or more facets such as sides 11, 12, 13, 18; lids 14, 15; and/or lips 16, 17. When the device produces the flat 10 from a larger substrate, it will cut the substrate along one or more cut lines (represented as solid lines in FIG. 1, see, e.g., line 20) and score or impress the substrate along one or more fold lines (represented as dashed lines in FIG. 1, see, e.g., line 21). Any of these items, such as facets, fold lines, and cut lines, may be considered structural features of the package. Any or all of the structural features, or combinations of the features, may have associated dimensions, such as width and height, that are included in the package's data file.

The substrate also may include printed content 25 such as letters, numbers, graphics, barcodes, or other material that is printed on the substrate. Some or all of the printed content 25 may be printed on the substrate before the substrate enters the package production device. For example, a barcode may be printed on the substrate, and if so the embodiments described in this document may use the barcode to obtain data and/or instructions for producing the package.

Barcodes and other data have been used to identify print production jobs. For example, U.S. Patent Application Publication Numbers. 2010/0214622 (Ruegg et al.) and 2008/0273945 (Levine et al.), the disclosures of which are incorporated by reference, describe methods and systems for producing books based on material that is printed on the cover. The cover may be scanned to locate printed material that can be used to identify the book, and a book block may then be retrieved from a repository based on the book's identification. The book is then printed based on raster image processing of the book block.

Automated package production requires much more data than does raster image processing of a book block. To produce a package, the production device requires not only content to be printed on the package, but also structural parameters and dimensions for each facet of the package. However, it would be impractical to include all of these features in a barcode, as the resulting barcode would need to be unreasonably large to contain all of the data in encoded form. In addition, it would be impractical to maintain a database with all possible package structural designs and sizes, as doing so would not permit users to create truly personalized packaging, down to a run length of one unique unit.

Figure 2:
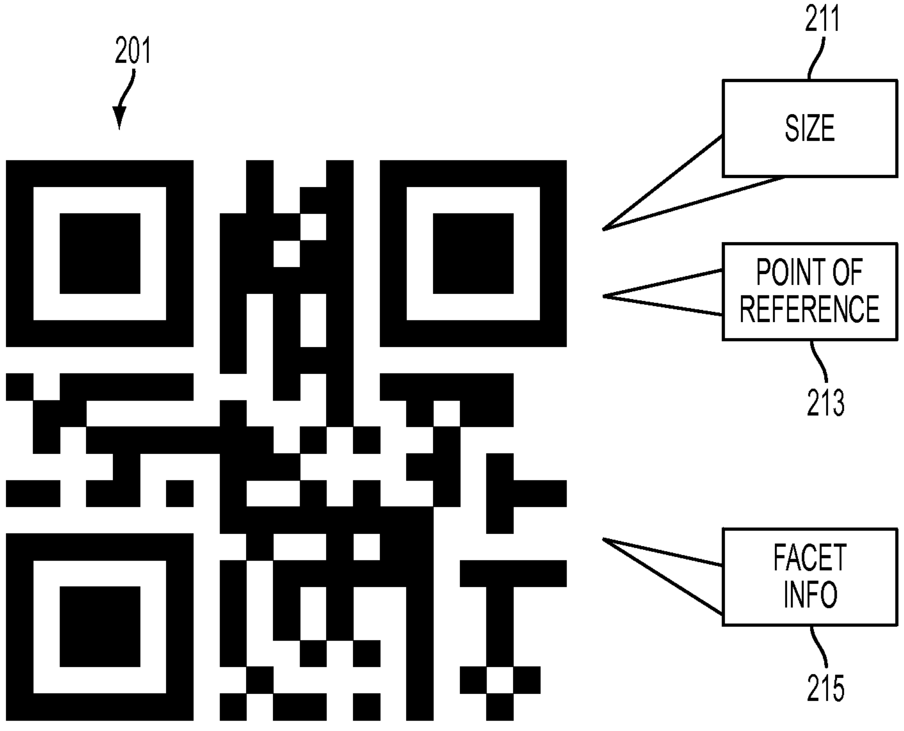
FIG. 2 is an example of a barcode and data that may be encoded in the barcode.

Thus, the embodiments described in this document include a package generation process in which a barcode is printed on a substrate, such as a substrate from which a package will be cut. FIG. 2 shows an example of a barcode 201 containing encoded data that may be used to produce a package. The barcode includes encoded data representing an overall size of the package 211, a point of reference for the package 213, and one or more structural parameters that provide information about at least one facet of the package 215. The structural parameters 215 may include features such as a type of facet (examples include side, lid or lip) and one or more dimensions of the facet (examples include length and width).

Figure 3:
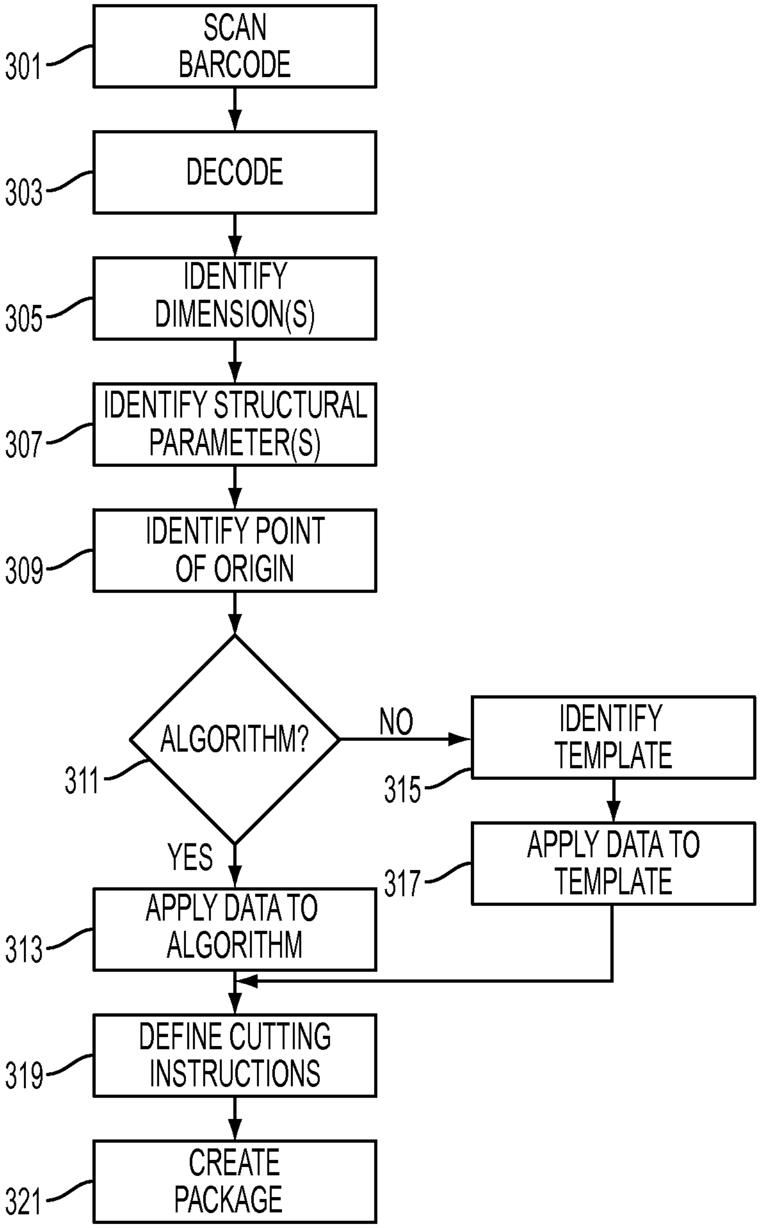
FIG. 3 is a flowchart describing a process for generating a set of instructions for creating a package.

However, the barcode need not include all details about each facet of the package. Instead, the barcode need only include details about a subset of the package's facets, such as only one facet of the package. A processor can then use this information to identify the package's remaining facets and determine instructions for creating the entire package. Various features of such a process are illustrated in the flowchart of FIG. 3. First, an image processing device may scan 301 a barcode and decode 303 the data contained in the barcode. As noted above, the barcode may be printed on the substrate from which the package will be formed. Alternatively, the barcode may be printed on a separate substrate, or presented on an electronic display, so that an imaging device may receive the barcode and an image capture module may decode it. The imaging device and/or image capture module may be elements of the package generation system, or they may be part of one or more separate devices that directly or indirectly send electronic signals to the package generation system.

A processor will review the decoded data to identify at least a package dimension 305 and a package structural parameter 307. These data points may be identified based on metadata, based on a position in the barcode, based on a format of or header associated with the data, or by any other suitable means. The package dimensions 305 may include an overall maximum height and/or width (x-coordinate and y-coordinate), a minimum height and/or width, or any other dimension for a two-dimensional package flat. The structural parameters 307 may include a type of package and/or an identification of one or more facets of the package, such as symmetries or shape. The parameters may include a side, lid, lip or other facet, optionally along with a descriptive element regarding a shape of the facet such as rectangular, square, triangular, or rounded. Optionally, the decoded data also may yield a point of reference 309 that the processor may use to identify a point on the substrate. A point of reference may include one or more coordinates, such as coordinates corresponding to a location that is x inches up from the bottom left corner of the uncut substrate and the bottom left corner of the uncut substrate and y inches to the right of that corner. Alternatively, each substrate may have a default point of reference, such as a center point, or a point at a corner of the substrate. In either situation, the structural parameters also may optionally include a distance away from the point of reference. For example, if the point of reference is a center of the uncut substrate, a structural parameter may indicate that a rectangular facet has an upper left corner that is to be positioned two inches to the right of, and five inches above, the center point.

In some embodiments, the encoded data also may include an algorithm 311 for the calculation of additional facets and positions of those facets. For example, if the encoded data describes an enclosed box, there may be additional data that indicates that a lid with overhanging sides is to be used. If so, then the processor may use the algorithm to process the data from the barcode and determine the remaining structural features 313.

Alternatively, the system may use the known information to identify a template 315 from a database that is stored in a computer-readable memory that is in communication with the processor. The template may include a set of rules that allow the processor identify what other facets should be generated based on the known information. The template also may include one or more algorithms, or one or more standard selections. The processor can then apply the barcode data to the template 317 to identify the remaining structural parameters.

Figure 4:
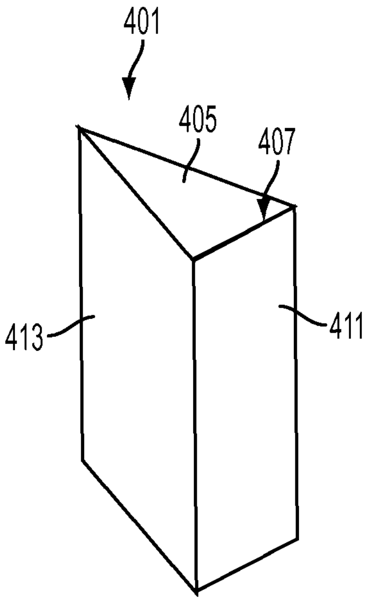
FIG. 4 illustrates an example of a three-dimensional package.

As an example, referring to FIG. 4, if the structural parameters indicate that a three-dimensional package is to be a triangular column 401, the barcode also may include data indicating that the package includes a triangular facet 405 having a four-inch base edge 407. The data also may indicate that an overall width and height of the cut two-dimensional flat from which the package will be formed is 10 inches high by 10 inches wide. If so, the template may include a rule set indicating that the remaining structural features will include a first facet 411 that is adjacent to the base edge 407, and that the first face has height corresponding to the overall height (10 inches) and a width corresponding to the width of the base. The processor may then determine, based on rules contained in the template, that the remaining structural features require two more facets 413 that are each adjacent to the first facet 411 along its 10-inch edge and adjacent to the triangular facet 405 along its two sides. The height of each side facet 413 would equal the total height (10 inches), and the width of each side facet 413 would equal (total width−base of triangle width)/2, or 3 inches.

Optionally, the template also may indicate that one or more lips (not shown) should be attached to either the triangular facet or any of the rectangular facets. The template would define the height, width and other features of each lip based on the dimensions of the facet to which it is attached. The number of lips and/or lids, and their positions, may vary based on the overall size of the package. For example, referring to FIG. 1, the template for a square box may include a rule stating that if the length of side 18 is ten inches or less, then two lips 17 should be positioned along the outer edge of side 18, each positioned three inches from an outside corner of side 18. On the other hand, if the length of side 18 is more than ten but less than twenty inches, then the rule may be that three lips 17 are required, one of which will be centered along the edge of side 18.

Figure 5:
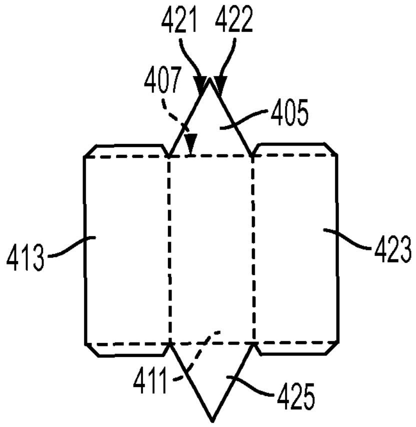
FIG. 5 shows a two-dimensional package flat that corresponds to the three-dimensional package of FIG. 4.

In addition, if the column is to be a closed column, the template may indicate that a second triangular facet having dimensions equal to those of the first triangular facet 405 should be provided. An example of how these features may be represented on a two-dimensional package flat is shown in FIG. 5. In addition to the features shown in FIG. 4, FIG. 5 also shows a second side facet 423 and a second triangular facet 425.

In this way, the system can use the barcode data to identify the facets, and dimensions for each facet, of a package without requiring all of the data to be encoded in the barcode or stored in a package-specific data file. In some embodiments, no more than 10 characters, 11 characters, or 12 characters, will be needed in the barcode. For example, a first character can be used to identify a media structure type (cube, triangular box 401, compact disc box, etc.), the 3 following characters can be used to identify an overall first dimension for the package (e.g., width, or distance along an x-axis), the next 3 characters can be used to identify an overall second dimension for the package (e.g., height, or distance along a y-axis), and the next 3 characters can be used to identify an overall third dimension for the package (e.g., depth, or distance along a z-axis). The last character could describe the type of lid to be used. Based on this information, the algorithm could use the rules for the template indicated by the first character along with the rest of the data to determine the geometry of the corresponding cut and fold lines as they would be applied to a package flat.

Returning to FIG. 3, after the system identifies the dimensions of the package flat and its facets, the system may define a set of cutting and/or scoring instructions 319 that the package generating device may use to apply cut lines and/or fold lines to the substrate and save those instructions to a computer readable memory such as a package generation file. The system may do this by retrieving a group of instructions for the edges of each facet from an instruction database, modifying groups as necessary based on each facet's relative position in the package, and then combining each retrieved group into an overall instruction set for the package flat. The instructions may include a series of instructions to either (a) apply a cut or fold line to the substrate, or (b) move the tool to a new position on the substrate without altering the substrate. For example, referring to FIG. 5, the instructions to create lid 405 may include instructions to: (1) move the cutter to the intersection of sides 421 and 413 of the lid; (2) apply a straight line cut from that point to the intersection of sides 421 and 422; (3) apply another straight line cut from that point to the intersection of sides 422 and 423; and (4) apply a straight line crease from that point to the intersection of sides 413 and 421. The system may determine whether a particular instruction for each facet edge (or portion thereof) should be a line or crease depending on whether that edge is an outer edge of the package flat (in which case a cut should be applied), or whether the edge is adjacent to another facet (in which case a crease should be applied).

Returning to FIG. 3, after the cutting instructions are defined, the package generation system may then apply the cutting instructions to the substrate 321 to create the package flat.

Figure 6:
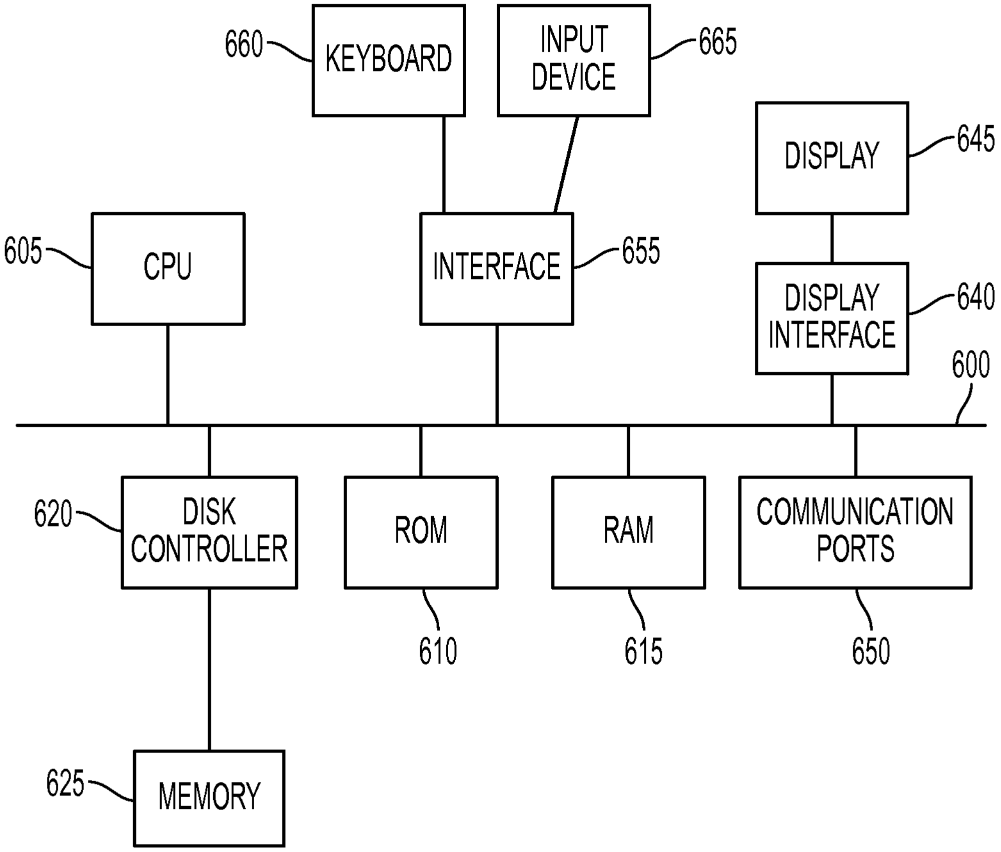
FIG. 6 is a block diagram showing elements of a computer system that may be used to implement various embodiments of the processes described in this document.

FIG. 6 depicts a block diagram of internal hardware that may be used to contain or implement program instructions for the package generation system and/or related devices as described above. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6 is a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. Communication with external devices, such as a printing device, may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:

by an imaging device, capturing an image of a barcode;

by an image capture module, decoding the barcode to retrieve data, wherein the data includes a package size dimension, a point of reference, and a package structural parameter;

by a processor:

using the package size dimension and the structural parameter to define dimensions for a first facet of a package flat, using the dimensions for the first facet and the point of reference to determine dimensions for a plurality of additional facets for the package flat, defining a set of cutting instructions based on the dimensions for the first facet and the dimensions for the additional facets; and by an automated package generation device, creating a package by using a cutting device to apply the cutting instructions to a substrate to yield the package flat.

2. The method of claim 1, wherein the capturing comprises capturing the image of the barcode as printed on the substrate.

3. The method of claim 1, wherein determining the dimensions for the plurality of additional facets also comprises retrieving a template from a database based on the package dimensions and the package structural parameter.

4. The method of claim 3, wherein the package structural parameter comprises a shape of a facet of the package, the template comprises a rule set, and determining the dimensions for the plurality of additional facets further comprises:
applying the shape and the package dimensions to the rule set to identify a plurality of additional facets for the package flat and, for each facet, a dimension set and a position relative to at least one of the other facets.

5. The method of claim 1, wherein defining the dimensions for the first facet and determining the dimensions for the additional facets further comprises, for each facet, defining a set of instructions to create a plurality of edges, wherein at least one of the edges comprises a cut line and at least a second of the edges comprises a fold line.

6. The method of claim 1, wherein defining the dimensions for the first facet comprises:
selecting an algorithm based on an indicator in the barcode; and
applying the structural parameter to the algorithm.

7. The method of claim 1, wherein the package structural parameter comprises information relating to at least one facet of the package.

8. The method of claim 1, wherein the package structural parameter comprises information relating to no more than one facet of the package.

9. An automated package generation system, comprising:
an image capture module configured decode a barcode to yield data corresponding to a package size dimension, a point of reference, and a structural parameter for a package;
a processor;
a cutting device; and
a computer-readable memory holding programming instructions that, when executed, instruct the processor to:
use the package dimensions and the structural parameter to define dimensions for a first facet of the package,
use the dimensions for the first facet and the point of reference to determine dimensions for a plurality of additional facets for the package,
define a set of cutting instructions based on the dimensions for the first facet and the dimensions for the additional facets;
instruct the cutting device to apply the cutting instructions to a substrate to yield a two-dimensional flat of the package.

10. The system of claim 9, further comprising an imaging device configured to capture an image of the barcode from the substrate and provide the image to the image capture module for the decoding.

11. The system of claim 9:
further comprising a database storing a plurality of package templates; and
wherein the programming instructions that, when executed, cause the processor to determine the dimensions for the plurality of additional facets comprise instructions to select a template from the database based on the package dimensions and the package structural parameter.

12. The system of claim 11 wherein:
the package structural parameter comprises a shape of a facet;
the selected template comprises a rule set; and
the programming instructions that, when executed, cause the processor to determine the dimensions for the plurality of additional facets also comprise instructions to:
apply the shape and the package dimensions to the rule set to identify a plurality of additional facets for the package flat; and
for each facet, identify a dimension set and a position relative to at least one of the other facets.

13. The system of claim 9, wherein the programming instructions that, when executed, cause the processor to define the dimensions for the first facet and determine the dimensions for the additional facets also comprise instructions to, for each facet, define a set of instructions to create a plurality of edges, wherein at least one of the edges comprises a cut line and at least a second of the edges comprises a fold line.

14. The system of claim 9, wherein the programming instructions that, when executed, cause the processor to define the dimensions for the first facet comprise instructions to:
select an algorithm based on an indicator in the barcode; and
apply the structural parameter to the algorithm.

15. The system of claim 9, wherein the package structural parameter comprises information relating to no more than one facet of the package.

16. The system of claim 9, wherein the package structural parameter comprises information relating to at least one facet of the package.

17. A computer-readable medium containing programming instructions that, when executed, cause a processor of an electronic device to:
capture an image of a barcode;
decode the barcode to retrieve package dimension data, a point of reference, and a package structural parameter;
use the package dimension data and the package structural parameter to define dimensions for a first facet of a package,
use the dimensions for the first facet and the point of reference to determine dimensions for a plurality of additional facets for the package,
define a set of cutting instructions based on the dimensions for the first facet and the dimensions for the additional facets; and
instruct an automated package generation device to apply the cutting instructions to create a package flat.

18. The computer-readable medium of claim 17, wherein the package structural parameter comprises a shape of a facet of the package, and wherein the instructions that, when executed, cause the processor to determine the dimensions for the plurality of additional facets comprise instructions to:
retrieve a template from a database based on the package dimension data and the package structural parameter; and
apply the shape and the package dimensions to the template to identify a plurality of additional facets for the package flat and, for each facet, a dimension set and a position relative to at least one of the other facets.

19. The computer-readable medium of claim 18, wherein the instructions that, when executed, cause the processor to determine the dimensions for the plurality of additional facets further comprise instructions to create a plurality of edges, wherein a first subset of the edges comprises cut lines and a second subset of the edges comprises a fold line.

20. The computer-readable medium of claim 19, wherein the instructions that, when executed, cause the processor to define the dimensions for the first facet further comprise instructions to:

select an algorithm based on an indicator in the barcode; and apply the structural parameter to the algorithm.

* * * * *